N. B. WOOD & E. R. FITCH.
PLATFORM-WAGONS.
No. 194,206. Patented Aug. 14, 1877.
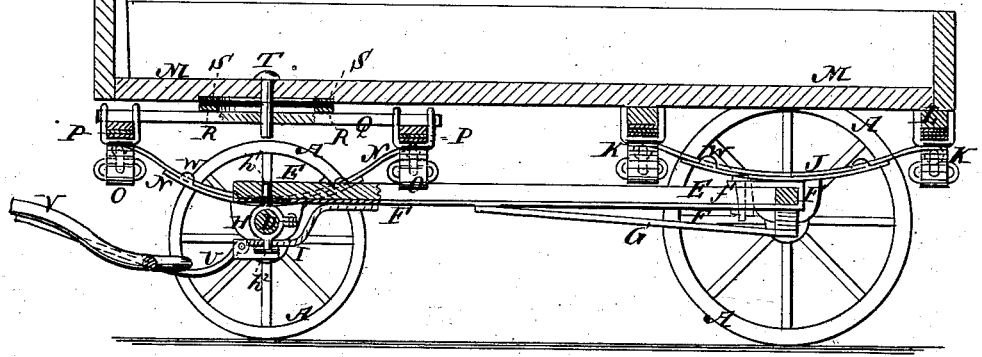
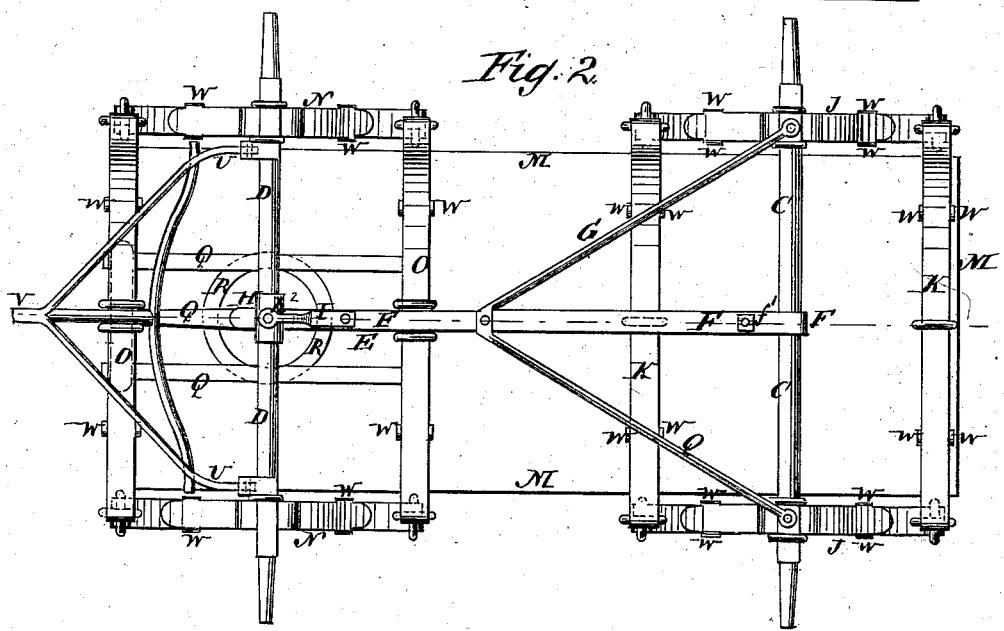
WITNESSES:
E. Wolff.
Alex F. Roberts
INVENTOR:
N. B. Wood
E. R. Fitch
BY Munn & Co
ATTORNEYS.

UNITED STATES PATENT OFFICE.

NATHANIEL B. WOOD AND ELLIOT R. FITCH, OF HUBBARDSVILLE, N. Y.

IMPROVEMENT IN PLATFORM-WAGONS.

Specification forming part of Letters Patent No. 194,206, dated August 14, 1877; application filed July 9, 1877.

*To all whom it may concern:*

Be it known that we, NATHANIEL B. WOOD and ELLIOT R. FITCH, of Hubbardsville, in the county of Madison and State of New York, have invented a new and useful Improvement in Platform-Wagons, of which the following is a specification:

Figure 1 is a vertical longitudinal section of a wagon to which our improvement has been applied. Fig. 2 is an under-side view of the same.

Similar letters of reference indicate corresponding parts.

The object of this invention is to furnish platform-wagons which shall be so constructed that the pole-irons may be attached directly to the axle, in which the forward and rear axles shall be connected by a reach, and in which the springs will not bind, and shall be less liable to break than with the usual construction.

The invention will first be described in connection with the drawing, and then pointed out in the claim.

A A are the wheels. C is the rear axle, and D is the forward axle. E is the reach, which is strengthened by an iron strap or bar, F, attached to its lower side. The rear end of the reach-iron F passes beneath the center of the rear axle C, is bent up over the upper side of said axle, and is secured to the upper side of the rear end of the reach E by a key-bolt, $f'$. The reach E F is strengthened against side strain by the braces G, the forward ends of which are secured to the middle part of the said reach, and their rear ends are secured to the end parts of the rear axle C. The forward end of the reach E F passes above the center of the forward axle D, and has a hole formed through it to receive the pivot $h^1$, formed upon the upper side of the band H, that passes around the center of the forward axle D, and has a pivot, $h^2$, formed upon its lower side, which passes through a hole in the forward end of the strap or open keeper I, the rear part of which is bent upward and rearward, and is secured to the under side of the said reach E F.

The band H may be open at the rear side of the axle D, its ends being bent outward and secured to each other by a bolt.

To the end parts of the rear axle C are secured the middle parts of two springs, J, the ends of which are shackled to the ends of two cross-springs, K. The middle parts of the cross-springs K are secured to the middle parts of two cross-bars, L, to which the wagon-body M is attached. To the end parts of the forward axle D are secured the middle parts of two cross-springs, N, the ends of which are shackled to the ends of two cross-springs, O. The middle parts of the cross-springs are attached to two head-blocks, P, to which are attached the ends of three bars, Q. To the middle part of the three bars Q is attached the lower part R of the fifth-wheel, the upper part S of which is attached to the wagon-body M. T is the king-bolt, which is secured to the wagon-body M, and passes through a hole in the center of the center bar Q.

With this construction, the irons U of the pole V can be attached directly to the forward axle D. This construction also enables the rear part of the pole to be made with an upward bend, which has heretofore been impracticable with platform-wagons.

Upon the side edges of each outer leaf of the springs J K N O are formed lugs W, which project past the side edges of the inner leaves, and thus keep the said leaves in proper position. This construction avoids the necessity of making slots in the leaves, and thus weakening them.

Having thus described our invention, we claim as new and desire to secure by Letters Patent—

A platform-wagon having the axles connected by a reach, the pole connected with the front axle D, and cross-springs N O, shackled together, provided with lugs W, and attached to head-blocks P, as and for the purpose specified.

NATHANIEL B. WOOD.
ELLIOT R. FITCH.

Witnesses:
WM. WOODS,
N. BROWNELL.